July 23, 1968 JOHN J. MIYATA 3,394,360

MAGNETO-OPTICAL TRANSLATOR

Original Filed Sept. 25, 1959

INVENTOR:
John J. Miyata
By Louis A. Kline
John J. Matlago
His Attorneys

United States Patent Office 3,394,360

Patented July 23, 1968

3,394,360
MAGNETO-OPTICAL TRANSLATOR

John J. Miyata, Los Angeles, Calif., assignor to The National Cash Register Company, Dayton, Ohio, a corporation of Maryland Continuation of application Ser. No. 842,407, Sept. 25, 1959. This application May 24, 1965, Ser. No. 465,817
7 Claims. (Cl. 340—174.1)

Figures 1, 2, 3:
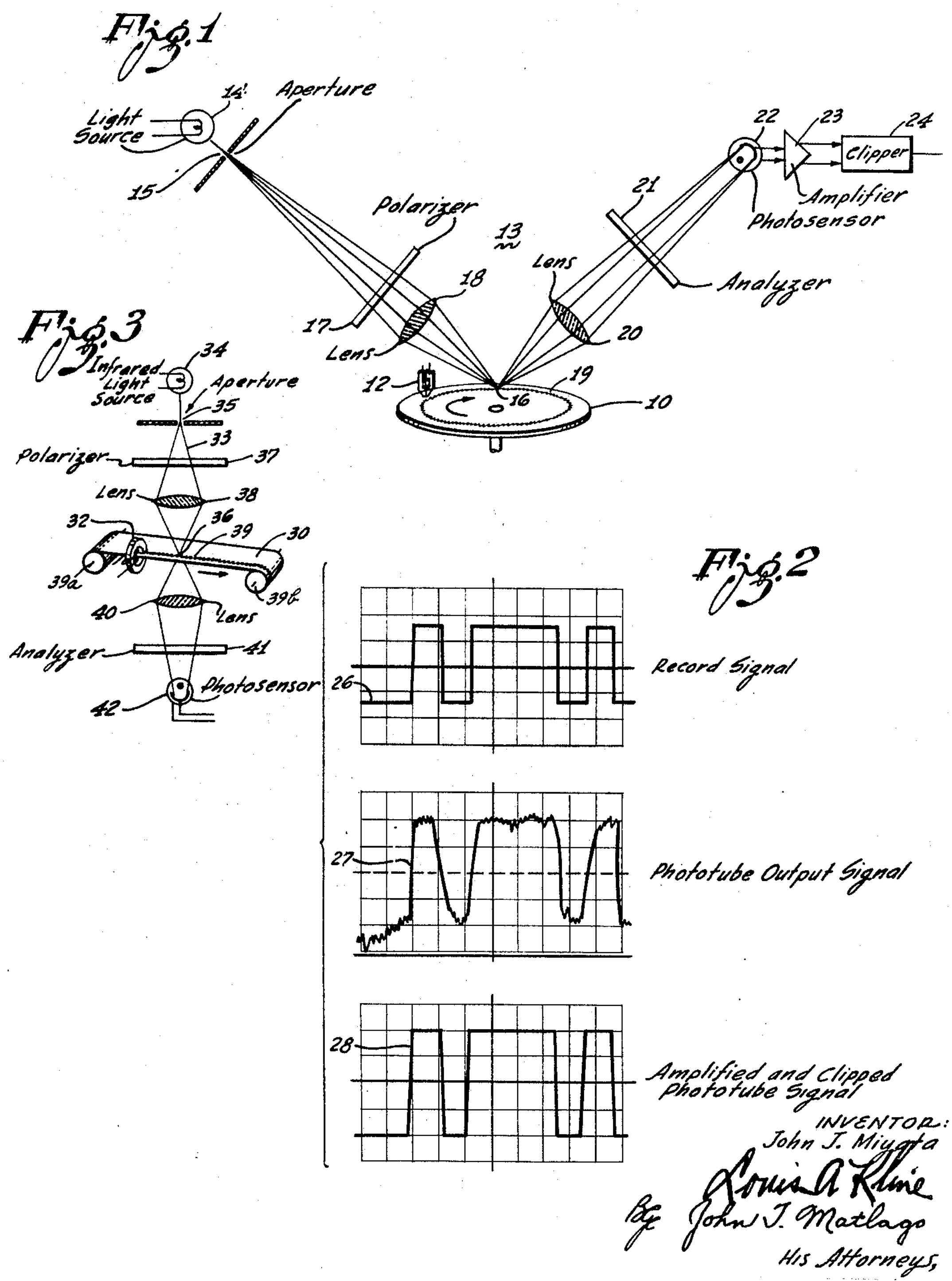

This is a continuation of application Ser. No. 842,407, filed Sept. 25, 1959 and now abandoned.

This invention relates to magnetic recording translator systems and more particularly to optical systems and devices for translating or reading recordings of magnetic data.

In many magnetic recording arrangements, the face of the magnetic transducer is spaced from the record medium during translation. This is a major limitation in obtaining high density data storage on a record medium. If the surface of the record medium is relatively inflexible, such as the surface of a disc or drum, for example, spacing of the face of the magnetic head or transducer from the surface of the record medium is required during recording or translating to prevent excessive wear which results from friction between opposing surfaces. In the event the spacing is not provided, deterioration of the opposing surfaces results from physical engagement of the face of the transducer and the coating of magnetic material on the record medium. An effect of such "in-contact" systems is the removal of the coating of magnetic material from the record medium leaving "bare spots," i.e., areas where no recording can be made, and data to be stored is lost. Further, magnetic material from a disc, drum, tape or other record medium may be deposited on the face of the transducer causing a failure of the transducer or a substantial decrease in efficiency. In addition, in such "in-contact" systems, excessive wear on the face of the magnetic head itself is incurred due to friction resulting from relative movement during physical engagement of the face of the magnetic head and the surface of the record medium. Since magnetic transducers or magnetic heads, particularly multi-channel transducers, are exceedingly expensive, and a major item of cost in the price of equipment employing them, it is a great advantage to provide for a reduction in wear.

In view of the foregoing, it is readily apparent that any increase in efficiency and life of magnetic recording equipment utilizing drums, discs, tape or the like is highly desirable and that "out-of-contact" systems are the most desirable in this request. Of particular concern, however, are the losses in signal amplitude and resolution in the operation of equipment utilizing drums and discs in arrangements where the face of the magnetic transducer is "out-of-contact," i.e., spaced from the surface of the record medium. Since the signal output from a conventional read or playback head in memory systems is produced by the rate of change of the flux field which is located at a distance equal to the spacing of the poles of the head from the surface coating, it is inevitable that the resolution of such a recording system will suffer. It has been further determined that the loss in resolution of an "out-of-contact" storage system is due, not so much to the separation of the head from the surface during the recording process, as it is to the separation of the head from the magnetized surface during translation, i.e., during the playback or reading process.

The present invention has been devised to overcome many of the limitations and disadvantages of prior systems and to provide high density magnetic memory systems by employing a conventional recording head for recording data on a magnetizable coating; and then employing a magneto-optical translator using a light beam which is modulated by the surface magnetization of the coating, for effectively reading the recording without having any physical contact between the translator and the coating. In this way, the advantages of reading with the head in-contact with the magnetized surface, as employed in systems utilizing magnetic tape for storage, for example, can be obtained on systems employing discs or drums without the problem of excessive wear of the translator or record medium.

The translators of the present invention employ well-known magneto-optical effects which occur when plane polarized light directed onto a magnetized surface has its plane of polarization altered. One phenomenon, which is designated as the Kerr effect, is produced when the plane of polarization is altered by the magnetic field upon reflection from the magnetized surface. The reflected light is actually elliptically polarized, but the degree of ellipticity is small, so that to a first approximation, the effect can be regarded as a rotation of the plane of polarization. Another phenomenon, which is commonly referred to as the Faraday effect, is evidenced by the rotation of the plane of polarization of light as it passes through the magnetic field of the material which is magnetized parallel to the direction of propagation of the incident light beam. In either case, the variation in direction of the light beam, as indicated by the amount of rotation of the plane of polarization, is proportional to the net magnetization of the coating of magnetic material and the direction of rotation of the plane of polarization is dependent upon the direction of the magnetization.

Thus, to provide a memory system in accordance with the above described scheme, a magnetic binary "bit" pattern is recorded on a magnetizable surface using a conventional recording head and, in order to read this recording, plane polarized light is passed through or reflected from the magnetized surface, and then transmitted through a properly oriented second polarizing element for producing an optimum signal output. The recorded pattern is thus read or sensed by observing the light transmitted through the second polarizing element and onto a photosensitive surface as a series of darker and lighter areas corresponding to the positive and negative directions of the initial head recording current. By moving the recorded area relative to a reading or translating device of this type and directing the light output onto a photosensor, an electrical signal similar in waveform to that of the recording current is obtained.

Thus, by properly aligning the polarizing elements, the positive magnetization state of the recorded surface, representing the storage of binary "one" bits, can be made to correspond to the higher light transmission state of the second polarizing element, and the negative magnetization state of the recorded surface representing the storage of binary "zero" bits can be made to correspond to the lower light transmission state of this polarizing element. It should be understood that the signal produced by the magneto-optical reading device corresponds to the actual magnetization state of the surface of the coating being sensed.

In the description, the term light, as used herein, is intended to include electromagnetic radiation generally, e.g., microwave radiation, ultra-violet light and infra-red light, and is not intended to be limited to the so-called visible portion of the spectrum.

An object of the present invention is the provision of a system having the foregoing features and advantages.

Another of the objects of this invention, therefore, is to provide a magneto-optical reading device for a magnetic memory system.

Another object of the invention is to provide a reliable, high density magnetic memory system.

Still another object is to provide an optical reading device and arrangement for surface magnetic storage systems whose signal output has a resolution equal to or better than the "in-contact" arrangement of memory systems utilizing magnetic tape.

A further object of the present invention is the provision of a reading device for magnetic storage systems in which the output signal amplitude is independent of the speed with which the magnetic recording moves relative to the reading device.

Other objects and advantages of the invention will hereinafter be made more apparent by the following description and claims, and illustrated in the accompanying drawing which discloses, by way of example, the principle of the invention and the best mode which has been contemplated of applying that principle.

In the drawings:

FIG. 1 is a schematic diagram showing the storage system of the present invention;

FIG. 2 isllustrates typical signal waveforms to provide a better understanding of the operation of the preferred arrangement; and FIG. 3 is a schematic illustration of an alternate preferred arrangement of the present invention.

In FIG. 1, a simplified diagram of the preferred embodiment of the storage system of the present invention is shown employing a magneto-optical translator which utilizes the well-known Kerr effect. As shown in the figure, a storage disc 10, which may be made of glass, for example, has a thin film of silver deposited on the surface thereof. This silver serves as a substrate for a thin film of ferromagnetic material which is deposited thereon by evaporation, or other known techniques. Preferably, the film is cobalt which has a substantially rectangular hysteresis loop characteristic, however, nickel, iron or other ferromagnetic material is suitable. In the preferred arrangement, a dielectric overcoating, such as silicon monoxide, is then evaporated onto the cobalt film to increase the magneto-optical rotation effect to be subsequently described. The resulting magnetic coating which is used for storage purposes has a smooth, mirror-like surface so as to efficiently reflect the light beams employed in the reading or translating device.

In the storage system of the present invention, as disclosed by the preferred embodiment shown in FIG. 1, a conventional recording head 12 is used to record binary data, represented by a non-return-to-zero waveform, for example, onto a track 19 of the drum magnetic surface. A typical record current signal waveform 26 is shown in FIG. 2. The memory system shown in FIG. 1 employs magneto-optical translator 13 for reading this recorded waveform. The translator 13 has an incident light path and a reflected light path. In the incident light path, light from a light source provided by an arc lamp 14, for example, is passed through a small aperture 15 to provide a beam which is directed onto a polarizer 17. An image forming lens 18 is then used for directing and focusing the polarized light beam transmitted by polarizer 17 onto the magnetic record track 19. In the reflected light path, a collecting lens 20, an analyzer 21, and a photosensor 22 are disposed to produce an output signal of the type illustrated by waveform 27 of FIG. 2, for example. The polarizer 17, is a dichroic crystal material, and is preferably a linear polarizer in sheet form, such as a molecular polarizer, in which the individual long-chain molecules are aligned to transmit selectively those vibrations which are parallel with or perpendicular to the alignment direction of the molecules. The linear polarizer is of the type which offers maximum light extinction properties when two such polarizers function as filters with their transmission axes crossed.

When the light beam from the light source 14 is transmitted through polarizer 17, the transmitted light is plane polarized. In the preferred arrangement, the polarizer 17 is oriented such that the plane of the polarized light beam is either parallel or perpendicular to the plane of incidence, i.e., to a plane common to the incident and reflected beam. Furthermore, in the preferred arrangement, the plane of polarized light, after being transmitted through the image forming lens 18, is directed onto the magnetic track 19 at a translating zone 16 at an angle of incidence of approximately 45°. The angle of incidence is not critical and any reflection of the light beam which is capable of detection is satisfactory, for example, an angle of incidence of 60° was found to provide for very satisfactory operation. The light beam reflected from the magnetized surface at the translating zone has its plane of polarization rotated. Although the reflected light is actually elliptically polarized, the degree of ellipticity is so small that the effect can be regarded as a rotation of the plane of polarization. The degree of rotation is dependent upon the amount of magnetization of the reflecting surface, and the direction of rotation is dependent upon the direction of magnetization.

A positive magnetic field, on the recording of track 19, for example, causes the plane of polarization to be rotated clockwise, and a negative magnetic field causes the plane of polarization to be rotated counterclockwise. The reflected rotated plane of light is transmitted through collection lens 20 onto analyzer 21, which latter is a polarizer, formed of material similar to the polarizer 17. The analyzer 21 is oriented to transmit only the light rotated by the positive magnetization of the recording onto the photosensor 22; thus the condition of high light transmission of the optical system to photosensor 22 corresponds to a binary character, such as the binary "one" bit. On the other hand, analyzer 21 transmits only a very small amount of the light rotated by the negative magnetization, and the resulting low output of the photosensor 22 corresponds to the other binary character, such as the binary "zero" bit.

Referring now to FIG. 2, it will be readily apparent upon examining a typical signal current waveform 27, representing the output of photosensor 22, that the amplitude of this output waveform is approximately proportional to the magnetization state of the track 19, as represented by the typical recording waveform 26. Further, this output waveform 27 is a true reproduction of the recording waveform 26, in contrast to a playback of the recording according to rate of change of the magnetization, as in a conventional magnetic playback head. The output of the photosensor is amplified by amplifier 23 and clipped in clipper 24 to provide high and low level signals corresponding to the input record current waveform 26, as illustrated by the signal waveform 28.

It should now be clear that in addition to the advantages set forth supra, e.g., the elimination of mechanical wear on the head and coating, a further advantage of the magneto-optical translator system of the present invention is that the memory disc, drum or other surface medium is simpler to manufacture since the mechanical runout of the surface is not as critical as with conventional playback heads where deviations of the head clearance deleteriously affect the signal readout. Further, by use of the present invention the resolution and signal-to-noise ratio of the output signal of a magnetic storage system is greatly improved since, by this approach, one obtains in disc systems, for example, signal waveforms which compare very favorably with "in-contact" tape systems using oxide coatings. Still further, the electronic waveshaping circuits for the readout device of the present invention tends to be simpler because the playback signal is proportional to the magnitude of the magnetization rather than the rate of change of the magnetization. Still further, the playback signal is not a function of the speed of the recording surface, but rather, completely independent of the speed thus resulting in a greater flexibility in the use of such equipment.

It should now be understood that another advantage resulting from the use of the magneto-optical translating system of the present invention is that an extremely thin film coating, on the order of 1000 Angstrom units, can be used for the magnetizable surface of the memory, inasmuch as the playback signal amplitude is a function of the magnetic state of the surface only, and is relatively independent of the coating thickness. This thin coating reduces the self-demagnetization and record head trailing effects, thereby greatly improving the resolution of the signal recording. As a result, by the use of the present invention, recording track densities may be increased beyond the present limits inasmuch as interaction of signals from adjacent tracks can be virtually eliminated.

It should be clear that it is within the purview of the present invention that the Faraday effect can be used instead of the Kerr effect to optically read magnetic recordings. The alternate preferred arrangement of a magneto-optical translator system, using the Faraday effect, is illustrated schematically in FIG. 3. In this system, polarized light is transmitted through a magnetic record medium in a direction which is parallel to the direction of magnetization of the magnetic material. Thus, in this system, polarized light is not reflected from but rather transmitted through the record medium; and, consequently, care must be taken to provide a suitable, light-transmissive medium for the magnetizable coating, since considerable attenuation of the transmitted signal due to absorption in the record medium could result in destroying the practicality of this approach.

Referring now to FIG. 3 for a detailed description of the apparatus employed in the alternate preferred arrangement, a record medium, shown as a magnetic tape 30, is disposed in the path of a main polarized light beam, as shown. The tape 30 is provided with a thin coating of iron oxide or extremely thin coating or film of magnetic material other than iron oxide such as cobalt, nickel, iron or alloys thereof, to provide a magnetizable film on which information is recorded by magnetizing the film in a direction normal to the surface thereof by a suitable magnetic transducer 32.

A light source 34 generates the light beam 33 which is directed onto the magnetic tape 30. The light source 34 is shown as an infra-red light source since the magnetic tape transmits such a light beam. The light source 34 is disposed opposite an aperture 35 for producing the beam of infra-red light 33. The beam of light 33 is plane polarized by a linear polarizer 37 which is similar to the linear polarizer 17 shown in FIG. 1. This plane polarized light beam is then directed onto a track 39 of the magnetic tape 30 at a translating zone 36 by a focusing lens 38. The light beam, in this instance the polarized infra-red light beam, on passing through the recording track on magnetic tape 30, at the translating zone, is modulated by the magnetic field which is parallel to the direction of propagation of the light beam. The modulation is a rotational modulation of the direction of polarization of the light beam. The modulated beam is directed onto the photosensitive surface of photosensor 42 after detection by analyzer 41. The axis of transmission of the analyzer 41 is oriented relative to the polarizer 37 to produce an amplitude or intensity modulated light beam having a proportionally increasing light output to the photosensor with increasing magnetic fields in a first direction, representing a first binary character; and a proportionally decreasing light output with a decreasing magnetic field in a second opposite direction, representing a second binary character.

Thus, as the beam of plane polarized light is directed onto the track 39 at the translating zone 36, the information magnetically recorded along the track 39 is translated by moving the magnetic tape through the light beam, as for example, by rewind and wind reels, 39*a* and 39*b*, respectively. The rotational variation of the plane of polarization of the light beam which is transmitted through the magnetic tape 30 is a function of the variation of the magnetic field in the translating zone during relative movement of the tape 30. The rotational variation of the light beam is converted to amplitude or intensity modulation of the light beam by the analyzer 41. The modulation of the light beam is detected by the photosensor 42 and converted to electrical signals which are modulated as a function of the light beam modulation. The photosensor 42 may be any photosensitive arrangement suitable for converting infra-red light modulation to electrical signal variation, e.g., photocells, photoconductors and phototubes. It should be understood that other frequency bands of electromagnetic radiation may be employed instead of the infra-red light band supplied by the source 34, the only limitation being that the record medium, including the magnetizable coating, be able to transmit the radiation without critical attenuation of the transmitted radiation due to absorption in the record medium so that the modulated light beam falling on the photosensitive surface of the photosensor 42 is sufficient to produce an output signal which is capable of being utilized in applications of the system.

There are many materials for the coatings that may be used with both the Kerr and Faraday effects. Cobalt, nickel, iron, and various alloys thereof may be employed. In general, it is desirable to have a material providing a highly reflective surface when employing the Kerr effect. In either arrangement, it is desirable to employ a magnetic material having a hysteresis loop which is approximately rectangular. Furthermore, in the preferred embodiment shown in FIG. 1, the overcoating, such as silicon monoxide, aids in maximizing the rotation of the plane of polarization of the reflected light, thus increasing the Kerr effect and accordingly the reliability of the system. Such expedients for maximizing the rotation of the plane of polarization in the presence of a magnetic field are important since the difference in angular positions of the light plane resulting from being reflected, for example, in the presence of a positive and negative magnetic field, respectively, is only on the order of a few tenths of a degree. It has been found in practice, however, that the change in light output from the analyzer, when sensing such magnetic fields in accordance with the present invention, can be readily and reliably detected by the photosensor to provide the corresponding binary output signals.

While the form of the invention shown and described herein is admirably adapted to fulfill the object primarily stated, it is to be understood that it is not intended to confine the invention to the forms or embodiments disclosed herein, for it is susceptible of embodiment in various other forms.

What is claimed is:

1. A system for recording and reproducing high density digital data comprising in combination: a movable record member having a thin film record surface of ferromagnetic material for storing binary signals therein, said thin film record surface having a thickness not exceeding 1,000 Angstroms; a magnetic record head responsive to said binary signals and disposed in close proximity to said record surface for magnetizing predetermined areas of said record surface in a direction parallel thereto according to said binary signals as each area passes under said head; and means for reproducing binary signals magnetically recorded in said record surface including means for producing a beam of polarized light and means for focusing said beam of light onto predetermined areas of said record surface, said beam of light being responsive to the magnetization of each predetermined area onto which it is directed so that the polarization of the light beam is rotated in accordance with the binary signals recorded in said predetermined areas, and means for detecting the rotation of the polarization of said light beam to produce electrical signals corresponding to the binary signals recorded in said predetermined areas.

2. An out-of-contact system for recording and reproducing high density digital data comprising in combination: a movable record member composed of a nonmagnetic substrate having a thin film record surface of ferromagnetic material coated thereon, the thickness of said film being chosen not in excess of 1,000 Angstroms so as to provide a substantially rectangular hysteresis characteristic for magnetically storing a series of high density high and low level binary signal currents of digital data; a magnetic record head disposed in close proximity to said thin film record surface, said record bead being responsive to said binary signal currents for magnetically recording said digital data in a direction parallel to said surface as the record surface passes under said record head to produce a high density magnetic recording of digital data in said record surface; and optical reproducing means for reproducing digital data magnetically recorded in said thin film record surface by said magnetic record head comprising, means for producing a polarized beam of light and focusing said beam of light onto predetermined portions of said record surface so that the polarization of the beam of light is responsive to the digital data recorded in said record surface, and means including analyzer means for detecting changes in the polarization of said light beam to reproduce said high and low level binary signal currents of digital data.

3. A system for recording and reproducing high density digital data comprising in combination: a movable record member having a thin film of ferromagnetic material providing a reflecting record surface wherein said thin film does not exceed 1,000 Angstrom units in thickness and said material has a hysteresis loop characteristic which is approximately rectangular, said record surface being capable of storing high density binary signals therein by magnetizing predetermined areas of said record surface in either one or the other of opposite directions in the plane of the thin film; a magnetic record head responsive to said high density binary signals and having an air gap disposed over said thin film record surface for magnetizing predetermined areas of said record surface passing under said air gap in one or the other of opposite directions according to said binary signals; and means for reproducing the high density binary signals magnetically recorded in the plane of said thin film comprising, means including a linear polarizing means for producing a plane polarized beam of light having a plane of incidence perpendicular to the record surface and a plane of polarization which is either parallel or perpendicular to the plane of incidence, means for directing the beam of plane polarized light and focusing said plane polarized beam of light onto predetermined areas of said record surface so that the plane of polarization of the reflected beam is responsive to the magnetization of each predetermined area onto which it is directed, the plane of polarization of the reflected beam being rotated in one or the other of opposite directions depending upon the direction of magnetization of each predetermined area onto which the polarized beam is directed, linear polarizing means disposed in the path of the reflected beam for detecting said rotation to pass reflected light rotated in a predetermined one of the opposite directions and block the reflected light rotated in the other direction, and means for detecting the light passed by said linear polarizing means to reproduce the high density binary signals recorded in those portions of said surface onto which the polarized beam is directed.

4. An out-of-contact system for recording and reproducing data comprising: a movable record member having a thin film record surface of ferromagnetic material provided thereon, said thin film record surface having a thickness not exceeding 1,000 angstroms; a magnetic recording head disposed in close proximity to said record surface for magnetically recording data in a direction parallel to said surface in predetermined portions thereof as each predetermined portion passes under said head;

means for directing a polarized light beam onto predetermined portions of said surface so that the polarization of the light beam after reaction with said record surface varies in accordance with the data recorded therein; means for sensing the variations in the polarization of the reacted light beam as said predetermined areas are scanned; and means coupled to the output of said last-mentioned means for producing electrical signals in response to the variations in the polarization of the reacted light beam.

5. A system for recording and reproducing high density digital data comprising: a movable record member having a thin film record surface of ferromagnetic material provided thereon, said thin film record surface having a thickness not exceeding 1,000 Angstroms, a magnetic recording head disposed in close proximity to said record surface for magnetically recording digital data in predetermined areas of said surface, the direction of magnetization of recording being substantially parallel to said surface, a source of polarized light, means for directing the light onto predetermined areas of said surface so that the polarization of the reflected light from said surface varies in accordance with the digital data recorded therein as a result of the Kerr magneto-optical effect, means for sensing the variations in the polarization of said reflected light as said predetermined areas are scanned, and means coupled to the output of said last-mentioned means for producing digital electrical signals in response to the variations in the polarization of said reflected light.

6. A system for recording and reproducing digital data comprising in combination: a movable record member having a thin film record surface of ferromagnetic material for storing binary signals therein, said thin film record surface having a thickness not exceeding 1,000 Angstroms, a magnetic record head responsive to said binary signals and disposed in close proximity to said record surface for magnetizing said record surface according to said binary signals, means for reproducing binary signals magnetically recorded in said record surface including means for producing a beam of polarized light and means for focusing said beam of light onto predetermined areas of said record surface, said beam of light being responsive to the magnetization of each predetermined area onto which it is directed so that the polarization of the light beam is rotated in accordance with the binary signals recorded in said predetermined areas, and means for detecting the rotation of the polarization of said light beam to produce electrical signals corresponding to the binary signals recorded in said predetermined areas.

7. A system for recording and reproducing data comprising: a movable record member having a thin film record surface of ferromagnetic material provided thereon, said thin film record surface having a thickness not exceeding 1,000 Angstroms, a magnetic recording head disposed in close proximity to said record surface for magnetically recording data in predetermined portions thereof, means for directing a polarized light beam onto predetermined portions of said surface so that the polarization of the light beam after reaction with said record surface varies in accordance with the data recorded therein, means for sensing the variations in the polarization of the reacted light beam as said predetermined areas are scanned, and means coupled to the output of said last-mentioned means for producing electrical signals in response to the variations in the polarization of the reacted light beam.

No references cited.

TERRELL W. FEARS, *Primary Examiner.*